J. H. WYATT.
FRUIT PICKER.
APPLICATION FILED JUNE 29, 1911.
1,016,663.
Patented Feb. 6, 1912.
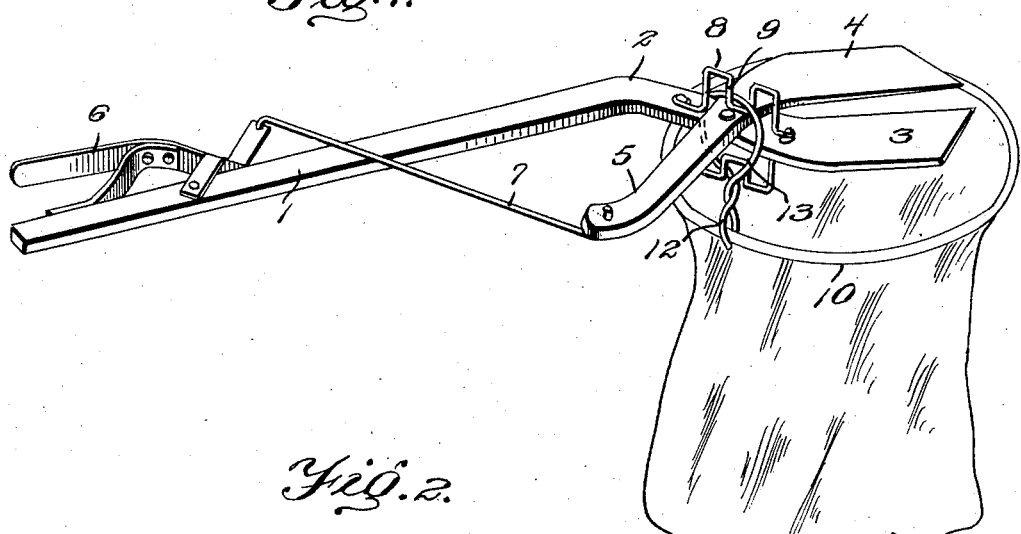
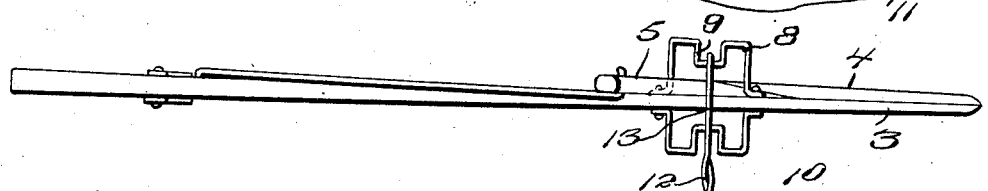
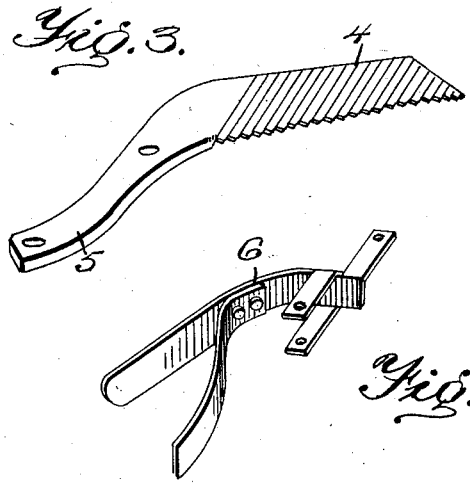
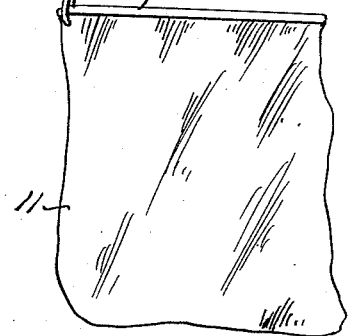
Inventor
J. H. Wyatt.
Witnesses
By
Attorneys.

UNITED STATES PATENT OFFICE.

JOHN H. WYATT, OF ROCKY FORD, COLORADO, ASSIGNOR OF ONE-FOURTH TO WALKER HALEY AND ONE-FOURTH TO CLAY HALEY, BOTH OF ROCKY FORD, COLORADO.

FRUIT-PICKER.

1,016,663.     Specification of Letters Patent.     Patented Feb. 6, 1912.

Application filed June 29, 1911. Serial No. 636,046.

*To all whom it may concern:*

Be it known that I, JOHN H. WYATT, a citizen of the United States, residing at Rocky Ford, in the county of Otero and State of Colorado, have invented certain new and useful Improvements in Fruit-Pickers, of which the following is a specification.

This invention has relation to fruit gatherers, and has for its object to provide a simple device of this character which is especially adapted to be used for collecting long stem fruit, such for instance as cherries, although the gatherer may be used to advantage for collecting other kinds of fruit.

With this object in view, the gatherer includes a handle staff having a fixed blade located at one end thereof. Another blade is pivoted to the handle staff and is connected with a lever mechanism mounted upon the staff, whereby the said blade may be swung to coöperate with the fixed blade to sever the stems of the fruit. Brackets are fixed upon the staff over the point of pivotal connection between the fixed blade and the pivoted blade, and a pouch supporting frame is provided with an eye which receives the said brackets in such manner that the handle staff and the blades may be rotated with relation to the frame.

For a full understanding of the invention reference is to be had to the following description and accompanying drawing in which:—

Figure 1 is a perspective view of the gatherer; Fig. 2 is a side view of the same; Fig. 3 is a perspective view of a modified form of blade which may be used upon the gatherer; Fig. 4 is a perspective view of a lever used upon the gatherer.

Corresponding and like parts are referred to in the following description and indicated in all the views of the accompanying drawing by the same reference characters.

The gatherer consists of a handle staff 1 which is provided at an intermediate point with an angularly disposed portion 2 upon which is mounted a fixed blade 3. A blade 4 is pivoted to the angularly disposed portion 2 of the staff 1 and is provided with an angularly disposed shank 5. A spring pressed lever 6 is fulcrumed upon the staff 1 in the vicinity of the handle end thereof and a rod 7 pivotally connects the working end of the said lever with the end of the shank 5 which is remote from the blade 4. The spring of the lever 6 bears against the side of the staff 1 and is under tension with
a tendency to hold the power end of the said lever away from the said staff, and when such is the case the rod 7 holds the shank 5 so that there is space between the blades 3 and 4. When the power end of the lever 6 is moved toward the staff 1 against the tension of its spring, the rod 7 is moved longitudinally, whereby the shank 5 is swung and the cutting edge of the blade 4 passes across the cutting edge of the blade 3.

Brackets 8 are fixed to the staff 1 at the opposite sides thereof and extend one over and the other under the point of pivotal connection between the angularly disposed portion 2 and the shank 5. The said brackets are of the same configuration and design and are provided at points intermediate their ends with inwardly disposed sections 9.

A pouch supporting frame is adapted to be used in conjunction with the device as hereinbefore described, and the said frame is preferably formed from wire having a relatively large loop 10 to which the edges of a pouch 11 are secured in any suitable manner. From the loop 10 the wire constituting the said frame is twisted upon itself, as at 12, and is continued into a loop 13 which is received within the inwardly disposed sections 9 of the brackets 8. The diameter of the loop 13 is such that it cannot pass freely over the end portions of the brackets 8, but the said brackets together with the handle staff and the parts supported thereby are free to turn within the loop 13.

As illustrated in Fig. 3 of the drawing, the blade 4 may be provided upon its side with a series of ridges which extend to the cutting edge of the blade, whereby the said cutting edge is rendered of serrated configuration.

In operation, the fixed blade 3 at the end of the handle staff 1, together with the pivoted blade 4, may be projected along or through the branches of a tree or bush bearing the fruit to be gathered until the stems of the fruit enter the space between the said blades. The operator then swings the power end of the lever 6 toward the handle end of the staff 1, when the cutting edge of the pivoted blade is carried across the cutting edge of the fixed blade and the stems of the fruit are severed. From the said blades the fruit will fall through the large loop 10 of the pouch frame into the pouch. By reason of the fact that the handle staff 1 may be rotated in the loop 13 of the pouch frame, the pouch may hang vertically, while the cutting blades may be held at an angle to a horizontal during the clipping operation so that the stems of the fruit may be readily severed, irrespective of the angle at which the fruit may stand out from its supporting branch.

Having thus described the invention, what is claimed as new is:

1. A gatherer comprising a staff, a blade carried thereby, a blade pivoted to the staff, brackets fixed to the staff at the opposite sides of the point of pivotal connection between the blades, and a pouch frame located below the blades and having a loop which loosely receives the brackets.

2. A gatherer comprising a staff, a blade carried thereby, a blade pivoted to the staff, means for swinging the pivoted blade, brackets attached to the staff and having intermediate inwardly disposed sections located at the opposite sides of the point of pivotal connection between the blades, and a pouch frame having a loop which is loosely received within the inwardly disposed portions of the said brackets.

In testimony whereof I affix my signature in presence of two witnesses.

JOHN H. WYATT. [L. S.]

Witnesses:
  GEO. M. COFFMAN,
  JOHN WHITAKER.

---

Copies of this patent may be obtained for five cents each, by addressing the "Commissioner of Patents, Washington, D. C."